(12) United States Patent
Lai

(10) Patent No.: US 7,663,813 B2
(45) Date of Patent: Feb. 16, 2010

(54) IMAGING LENS MODULE

(75) Inventor: Shu-Tzu Lai, Taichung (TW)

(73) Assignee: Newmax Technology Co., Ltd., Taichung County (TW)

( * ) Notice: Subject to any disclaimer, the term of this patent is extended or adjusted under 35 U.S.C. 154(b) by 58 days.

(21) Appl. No.: 12/003,794

(22) Filed: Jan. 2, 2008

(65) Prior Publication Data

US 2009/0168201 A1    Jul. 2, 2009

(51) Int. Cl.
*G02B 9/60* (2006.01)
*G02B 13/18* (2006.01)
*G02B 9/34* (2006.01)

(52) U.S. Cl. .................... 359/770; 359/708; 359/714; 359/763; 359/771

(58) Field of Classification Search ......... 359/749–753, 359/713–715, 745–746, 754–756, 761, 763, 359/770, 740, 644, 645, 659–660, 708, 781
See application file for complete search history.

(56) References Cited

U.S. PATENT DOCUMENTS 5,724,195 A * 3/1998 Enomoto et al. ............ 359/752

FOREIGN PATENT DOCUMENTS

JP            04315118 A  * 11/1992

* cited by examiner

*Primary Examiner*—Darryl J Collins
*Assistant Examiner*—Zachary Wilkes
(74) *Attorney, Agent, or Firm*—Banger Shia

(57) ABSTRACT

An imaging lens module includes a fixed diaphragm and an optical module. The optical module includes first, second, third, fourth and fifth lenses arranged from an object side to an image side in a sequence of: the first lens, having a negative refractive power, a convex surface disposed towards the object side, and a concave surface disposed towards the image side; the diaphragm; the second lens having a positive refractive power and a convex lens disposed towards the image side; and the third lens; being a meniscus negative lens; the fourth lens, being a positive lens, and adhered with the third lens to form a composite lens; the fifth lens, having a positive refractive power, such that the imaging lens module is a lens module with the features of high imaging quality and high yield rate.

7 Claims, 6 Drawing Sheets

Non-point aberration   Distorted aberration

Spherical surface aberration

Focal length : f = 4.45 mm
(F NO.) : F 2.4
Viewing angle : 2ω= 71.6°

| Sur | Radius | Thickness | Nd | Vd |
|---|---|---|---|---|
| OBJ | Infinity | Infinity | | |
| 1 | Infinity | 0 | | |
| 2 | 3.657597 | 1.26409 | 1.531139 | 56.2 |
| 3 | 1.429312 | 1.40115 | | |
| STO | Infinity | 0.2797406 | | |
| 5 | 7.455855 | 2.263138 | 1.531139 | 56.2 |
| 6 | -2.357658 | 0.0891287 | | |
| 7 | 6.007052 | 0.5656628 | 1.84666 | 23.8 |
| 8 | 2.435233 | 1.632245 | 1.72916 | 54.7 |
| 9 | 5.177247 | 1.2586 | | |
| 10 | 13.18155 | 0.9004936 | 1.531139 | 56.2 |
| 11 | 44.45536 | 0.2 | | |
| 12 | Infinity | 0.4 | 1.5168 | 64.2 |
| 13 | Infinity | 1.325393 | | |
| 14 | Infinity | 0.5 | 1.5168 | 64.2 |
| 15 | Infinity | 0.045 | | |
| IMA | Infinity | | | |

SURFACE DATA DETAIL:

Surface   2
K:     0.3515864
A:     0.0014045145
B:    -0.00014493607
C:    -3.762852e-005
D:     5.47322e-006
Surface   3
K:     0.154321
A:     0.001325181
B:    -0.0032038594
C:     0.0012092054
D:    -0.00090964104-0.002629891
Surface   5
K:     1.215122
A:    -0.0022307189
B:    -0.0011481851
C:     0.0018866158
D:    -0.00043429408

Surface   6
K:     0.2154861
A:     0.0025425067
B:     0.0016276144
C:    -0.0005123481
D:     0.00013198657
Surface   10
K:     0
A:    -0.0051258671
B:    -0.0013508809
C:    -0.0001352585
D:     5.21564e-005
Surface   11
K:     0
A:     0.0027549879
B:    -0.0025012433
C:     0.00014688999
D:     2.2156724e-007

Formula for the preferred embodiment:
|f|/|f1|=0.81        |f|/|f2|=1.22        |f|/|f5|=0.13

FIG. 1B

Non-point aberration   Distorted aberration

Spherical surface aberration

Focal length : f = 4.47 mm
(F NO.) : F 2.4
Viewing angle : 2ω = 71.56°

| Sur | Radius | Thickness | Nd | Vd |
|---|---|---|---|---|
| OBJ | Infinity | Infinity | | |
| 1 | Infinity | 0 | | |
| 2 | 3.231565 | 0.4974657 | 1.525000 | 56.2 |
| 3 | 1.624897 | 1.724091 | | |
| STO | Infinity | 0.1174276 | | |
| 5 | 8.119577 | 2.267533 | 1.525000 | 56.2 |
| 6 | -2.446718 | 0.4252047 | | |
| 7 | 6.006737 | 0.5654944 | 1.84666 | 23.8 |
| 8 | 2.409587 | 1.674851 | 1.72916 | 54.7 |
| 9 | 5.8451 | 1.898026 | | |
| 10 | -4.354815 | 0.5552286 | 1.525000 | 56.2 |
| 11 | -5.15487 | 0.1 | | |
| 12 | Infinity | 0.4 | 1.5168 | 64.2 |
| 13 | Infinity | 1.35 | | |
| 14 | Infinity | 0.5 | 1.5168 | 64.2 |
| 15 | Infinity | 0.045 | | |
| IMA | Infinity | | | |

SURFACE DATA DETAIL:

Surface   2
K:   0.3215
A:   0.00824897
B:   -0.0019735489
C:   0.00032700845

Surface   3
K:   0.0054687
A:   0.0021597956
B:   -9.8030779e-005
C:   -0.0016042515

Surface   5
K:   -1.2548
A:   -0.00201657
B:   -0.0015647643
C:   0.0005215746
D:   -0.00019160654

Surface   6
K:   0.032674
A:   0.010654
B:   0.00075694854
C:   -0.00010402814
D:   6.2157487e-005

Surface   10
K:   1.848967
A:   -0.01564897
B:   -0.0016227272
C:   -5.21579e-005
D:   -1.908476e-005

Surface   11
K:   0.02564
A:   0.005041564
B:   -0.0011809573
C:   -1.9132329e-005
D:   5.2156487e-006

Formula for the preferred embodiment:
$|f|/|f1|=0.64$     $|f|/|f2|=1.16$     $|f|/|f5|=0.064$

FIG. 2B

IMAGING LENS MODULE

BACKGROUND OF THE INVENTION (1) Field of the Invention

The present invention relates to the field of optical lenses, and more particularly to an imaging lens module capable of providing excellent imaging effect.

(2) Description of the Prior Art

As digital imaging technologies used for optical lenses becomes extensively used, particularly used for digital carriers such as mobile phones, PC CAM, DSC or DVC, etc. The digital carrier tends to be miniaturized under the industrial research and development and market trend, and also emphasizes in the light, thin, short and small structure, high performance and scale of economic effect, and thus the lens module in the carrier also requires the miniaturization, and the development of imaging lens module is improved with such trend and manufacturers spare no effort to produce imaging lens modules with high quality in the severe industrial competition. However, a prior art generally uses a lens module composed of 3 or 4 lenses, and thus a high imaging quality cannot be achieved due to excessively large color difference and aberration, and the prior art is not applicable for high-end lenses. If the high imaging quality is maintained, the optical length will become longer, and a general small electronic carrier will be unable to take care of the space and quality at the same time due to the limitation of space.

SUMMARY OF THE INVENTION

The primary objective of the present invention is to provide a high-quality imaging lens module designed by five lenses that are made of glass or plastic material with aspheric surfaces.

Another objective of the present invention is to compensate the color difference by adhering the lenses, and correct the aberration by the last piece of the plastic lens, so as to control the sensitivity of tolerance and enhance the yield rate of production.

To achieve the foregoing objectives, the present invention provides an imaging lens comprising a fixed diaphragm and an optical module, and the optical module comprises first, second, third, fourth and fifth lenses arranged from an object side to an image side in the sequence of:

the first lens, having a negative refractive power, a convex surface disposed towards the object side, and a concave surface disposed towards the image side; the diaphragm; the second lens, having a positive refractive power, a convex surface disposed towards the image side; the third lens, being a negative meniscus lens, and having an absolute value of a radius of curvature facing the image side smaller than an absolute value of a radius of curvature facing the object side; the fourth lens, being a positive lens, and having the absolute value of a radius of curvature facing the image side greater than the absolute value of a radius of curvature facing the object side, wherein the third and fourth lenses are adhered to form a composite lens; and the fifth lens, having a positive refractive power.

The structural design of the aforementioned imaging lens module will now be described in more detail hereinafter with reference to the accompanying drawings that show various embodiments of the invention.

BRIEF DESCRIPTION OF THE DRAWINGS

FIG. 1B shows a schematic view of the data of optical features and aspheric surface coefficients in accordance with a first preferred embodiment of the present invention;

FIG. 2B shows a schematic view of the data of optical features and aspheric surface coefficients of an imaging lens module in accordance with a second preferred embodiment of the present invention.

DETAILED DESCRIPTION OF THE PREFERRED EMBODIMENTS

Figure 1:
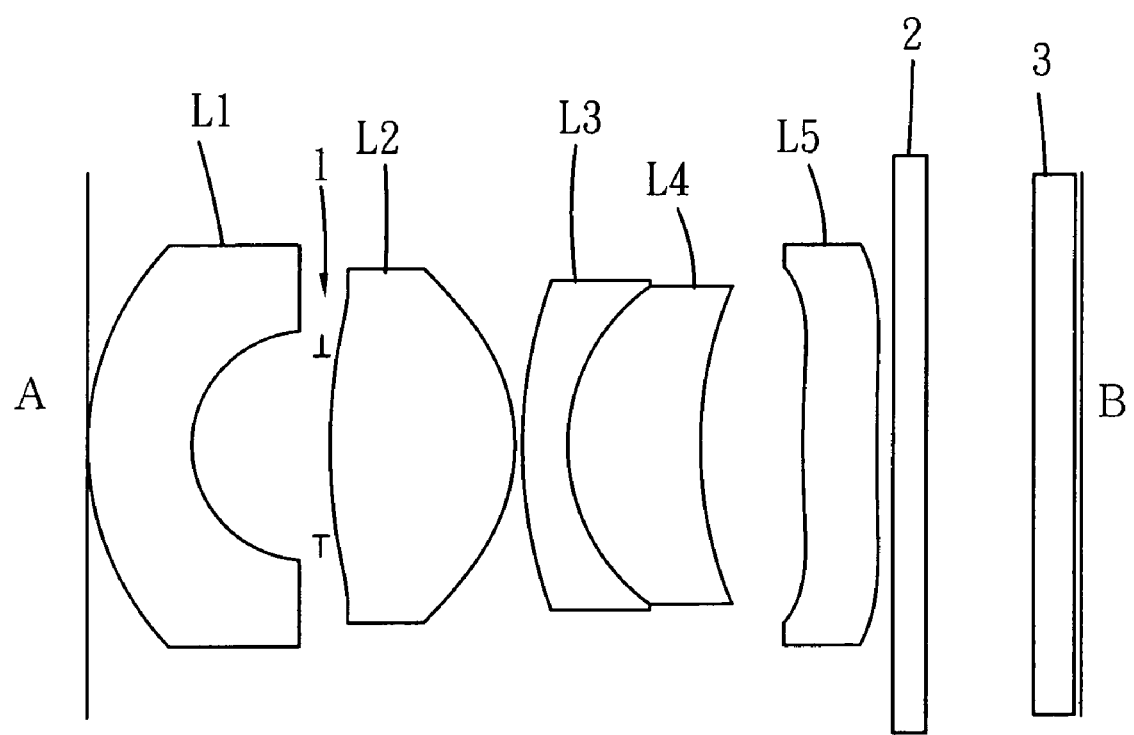
FIG. 1 shows a schematic view of an imaging lens module in accordance with a first preferred embodiment of the present invention.
Figure 1A:
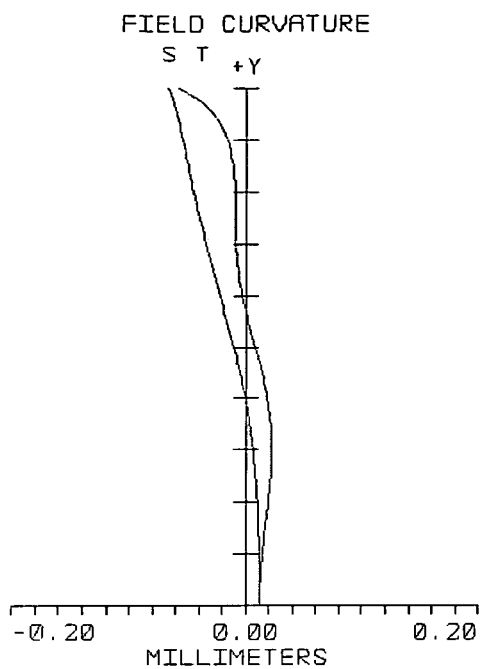
FIG. 1A shows a schematic view of the aberration of an imaging lens module in accordance with a first preferred embodiment of the present invention.
Figure 1A:
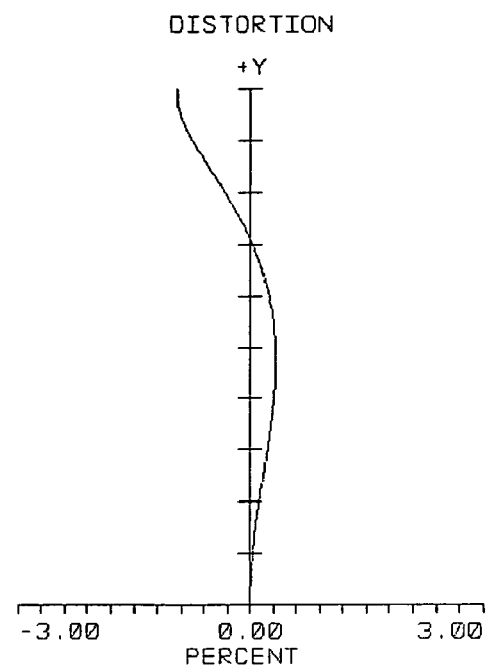
Figure 1A:
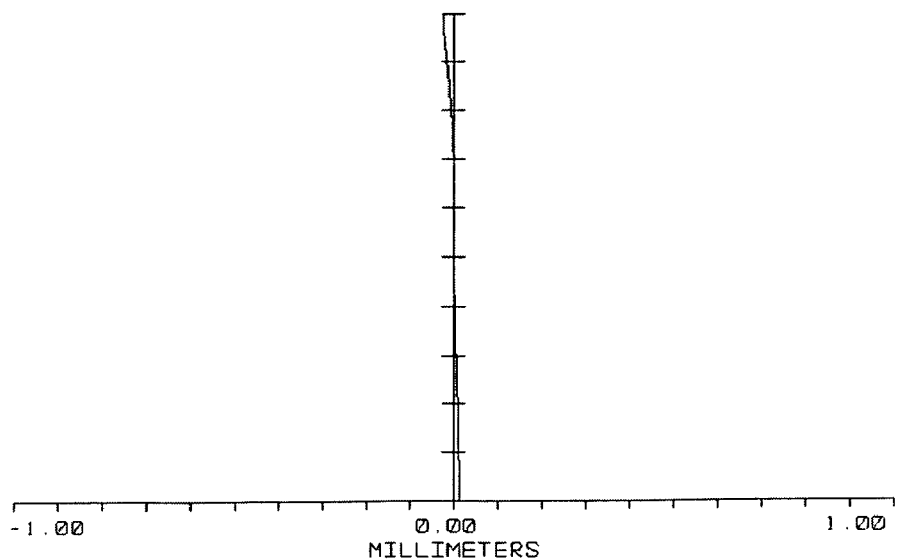
Figure 2:
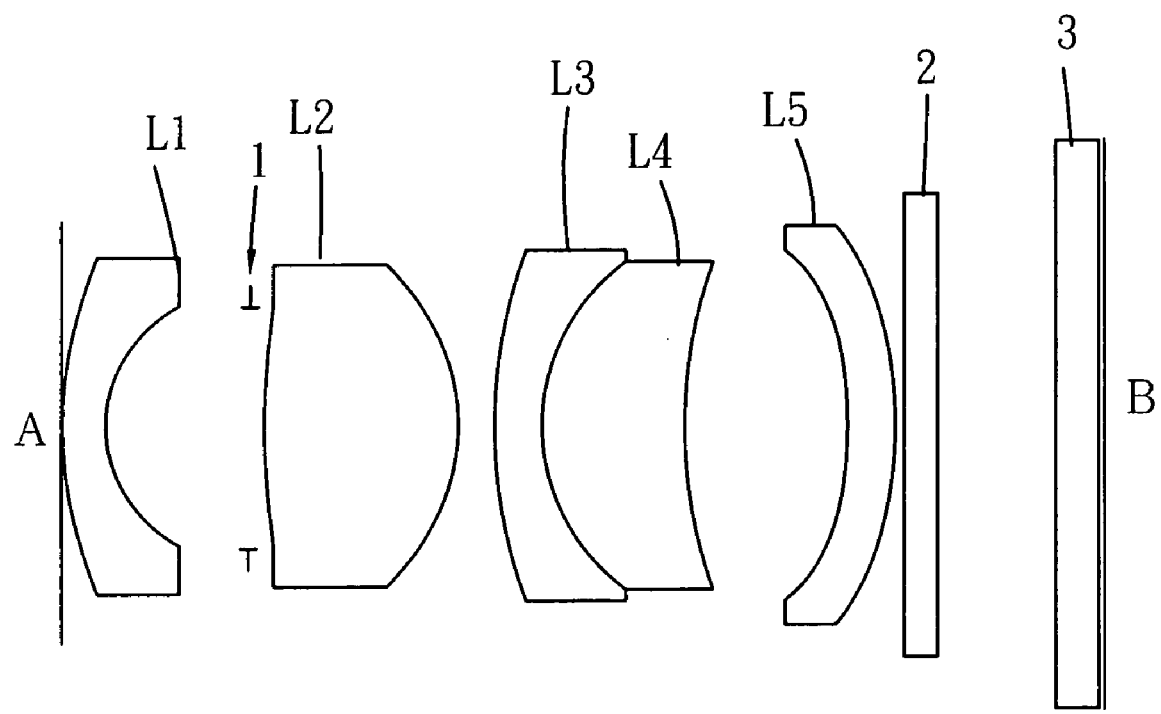
FIG. 2 shows a perspective view of an imaging lens module composed of lenses in accordance with a second preferred embodiment of the present invention.
Figure 2A:
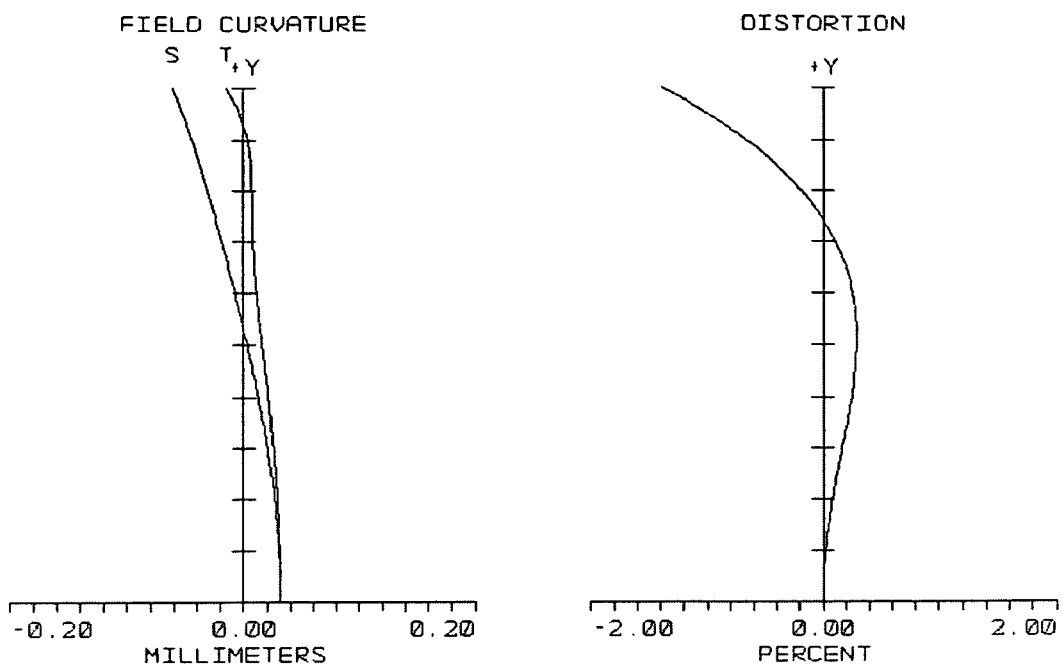
FIG. 2A shows a schematic view of the aberration of an imaging lens module of an imaging lens module in accordance with a second preferred embodiment of the present invention.
Figure 2A:
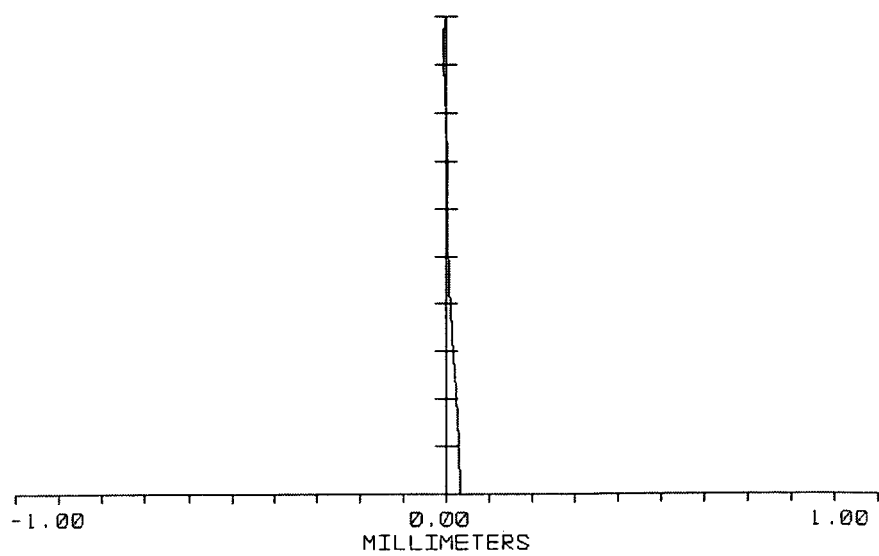

FIGS. 1 and 2 show schematic views of lens modules in accordance with the first and second preferred embodiments of the present invention respectively, and FIGS. 1A and 2A show schematic views of the aberrations of imaging lens modules in accordance with the two preferred embodiments of the present invention respectively, and FIGS. 1B and 2B show schematic views of the data of optical features and aspheric surface coefficients in accordance with the two preferred embodiments of the present invention respectively. Referring to FIGS. 1B and 2B, the change of numeric values of each preferred embodiment of the present invention is obtained by a simulated design. Even if different numeric values are used, products of the same structure still fall within the scope of claims of this invention.

In FIG. 1, the present invention relates to an imaging lens module, comprising a fixed diaphragm 1 and an optical module, and the optical module comprises a first lens L1, a second lens L2, a third lens L3, a fourth lens L4 and a fifth lens L5, and each lens is a lens made of a plastic material and arranged from the an object side A to an image side B in a sequence of:

the first lens L1, having a negative refractive power, a convex surface disposed towards the object side A, a concave surface disposed towards the image side B, and at least one surface being an aspheric surface;

the diaphragm 1, disposed between the first lens L1 and the second lens L2;

the second lens L2, having a positive refractive power, an image side B disposed towards the convex surface, and at least one surface being an aspheric surface;

the third lens L3, being a negative meniscus lens, and having the absolute value of a radius of curvature facing the image side B smaller than the absolute value of a radius of curvature facing the object side A;

the fourth lens L4, being a positive lens, and having the absolute value of a radius of curvature facing the image side B greater than the absolute value of a radius of curvature facing the object side A, wherein the third and fourth lenses L3, L4 are adhered to form a composite lens; and the fifth lens L5, having a positive refractive power, a concave surface disposed towards the object side A, a convex surface disposed towards the image side B, and at least one surface being an aspheric surface.

A first plane glass 2 installed behind the fifth lens L5 has an effect of filtering infrared rays. In addition, a second plane glass 3 is installed before the image side B for providing an effect of protecting the light sensor and used for image sensors of different packages and providing a better imaging quality. Further, the image side B refers to a light sensor for capturing images, and the light sensor is a CCD or a CMOS.

In the invention, the imaging lens module satisfies the following condition to achieve the best quality:

$$0.6 < |f|/|f1| < 1.0$$

Where, |f1| is the absolute value of the focal length of the first lens L1, and |f| is the absolute value of the focal length of the whole lens module;

$$1.0 < |f|/|f2| < 1.5$$

Where, |f2| is the absolute value of the focal length of the second lens; L2 is the value of focal length, and |f| is the absolute value of the focal length of the whole lens module; and $$0.04 < |f|/|f5| < 0.25$$

Where, |f5| is the absolute value of the focal length of the fifth lens L5, and |f| is the absolute value of the focal length of the whole lens module.

In the imaging lens module of the invention, the optical module satisfies the following condition before the imaging effect of the optical module can be optimized, and any deviation above or below the required condition will result in a less effective imaging effect of the optical module.

The schematic views of the aberration of the invention illustrate a non-point aberration, a distorted aberration and a spherical surface aberration as shown in FIGS. 1A and 2A. Regardless of which aberration, the aberration relates to a data of a line d, and the non-point aberration relates to the data of a S image plane (SAGITAL) which is related to the data of a T image plane (TANGENTIAL). From the figures of the aberrations, the correction of the aberration of the invention is obtained completely from a simulated design, and thus there will be no problems in practical applications.

Referring to FIGS. 1B and 2B for the data of aspheric surface of the first and second preferred embodiments of the present invention respectively, the data at the top represent the numerals of each lens and element of the optical module of the invention as follows:

The value of F. No.~the F value shows the parameter of brightness. The smaller the value of F, the higher is the brightness.

Angle of viewing~2ω.

Focal Length~f; and f is the overall focal length (mm) of the optical module, and 1, 2, 3, 4, 5, 6, 7, 8, 9, 10, 11, 12, 13, 14, 15 listed below are numbers of lenses counting in a sequence starting from the object side; and the surface numbers 2, 3 represent two surfaces of the first lens L1, and the surface numbers 5, 6 represent two surfaces of the second lens L2, and the surface numbers 7, 8, 9 are surfaces of a composite lens formed by adhering the third and further lenses L3, L4, and 10, 11 represent two surfaces of the fifth lens L5, and 12, 13, 14, 15 represent two surfaces of the first plane glass 2 and the second plane glass 3 respectively.

Since both surfaces of each lens of the optical module of the invention are aspheric surfaces, the shape of the aspheric surfaces must satisfy the conditions of the following formula:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

where, z is the value of a reference position with respect to a vertex of the surface along the optical axis and at a position with a height h;

k is a conic constant;

c is the reciprocal of a radius of curvature; and

A, B, C, D, E, G, . . . are coefficients of high level aspheric surfaces.

After the aforementioned structure is assembled, the third and fourth lenses L3, L4 are combined to control the color difference of the imaging effectively, and the fifth lens L5 is used to correct the aberration, so as to achieve a high quality imaging effect. Further, the lens module of the invention adopts plastic lenses with aspheric surfaces to achieve a wider angle of viewing and a higher resolution, so as to reduce the number of lenses required for the aforementioned imaging effect.

What is claimed is:

1. An imaging lens module, comprising a fixed diaphragm and an optical module, and the optical module comprising first, second, third, fourth and fifth lenses arranged from an object side to an image side in a sequence of:

the first lens, having a negative refractive power, a convex surface disposed towards the object side, and a concave surface disposed towards the image side;

the diaphragm;

the second lens, having a positive refractive power, a convex surface disposed towards the image side;

the third lens, being a negative meniscus lens, with the absolute value of a radius of curvature facing the image side smaller than the absolute value of a radius of curvature facing the object side;

the fourth lens, being a positive lens, with the absolute value of a radius of curvature facing the image side greater than the absolute value of a radius of curvature facing the object side, wherein the third and fourth lenses are adhered to form a composite lens; and the fifth lens, having a positive refractive power;

wherein 1<|f|/|f2|<1.5, and |f2| is the absolute value of the focal length of the second lens, and |f| is the absolute value of the focal length of the whole lens module.

2. The imaging lens module of claim 1, wherein at least one surface of the first lens is an aspheric surface.

3. The imaging lens module of claim 1, wherein at least one surface of the second lens is an aspheric surface.

4. The imaging lens module of claim 1, wherein at least one surface of the fifth lens is an aspheric surface.

5. The imaging lens module of claim 1, wherein 0.6<|f|/|f1|<1.0, and |f| is the absolute value of the focal length of the first lens, and |f| is the absolute value of the focal length of the whole lens module.

6. The imaging lens module of claim 1, wherein 0.04<|f|/|f5|<0.25, and |f5| is the absolute value of the focal length of the fifth lens, and |f| is the absolute value of the focal length of the whole lens module.

7. The imaging lens module of claim 1, wherein an aspheric surface is in a shape satisfying the formula of:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

and z is the value of a reference position with respect to a vertex of the surface along the optical axis and at a position with a height h; k is a conic constant; c is the reciprocal of a radius of curvature; and A, B, C, D, E, G are coefficients of high level aspheric surface.

* * * * *